United States Patent [19]

Jahn

[11] 3,870,531

[45] Mar. 11, 1975

[54] OPTICAL FLINT GLASS WITH RELATIVELY LOW REFRACTIVE INDICES AND HIGH DISPERSION

[75] Inventor: Walter Jahn, Ingelheim, Germany

[73] Assignee: JENAer Glaswerk Schott & Gen, Mainz, Germany

[22] Filed: July 17, 1972

[21] Appl. No.: 272,628

[30] Foreign Application Priority Data
July 28, 1971 Germany.......................... 21377480

[52] U.S. Cl..................... 106/52, 106/47 Q, 106/53
[51] Int. Cl............................................... C03c 3/04
[58] Field of Search...................... 106/47 Q, 52, 53

[56] References Cited
UNITED STATES PATENTS

| | | | |
|---|---|---|---|
| 3,446,638 | 5/1969 | Bromer | 106/52 |
| 3,460,954 | 8/1969 | Young | 106/54 |
| 3,536,504 | 10/1970 | Faulstich et al. | 106/54 |
| 3,589,918 | 6/1971 | Jahn | 106/53 |
| R21,175 | 7/1939 | Morey | 106/52 X |

Primary Examiner—Patrick P. Garvin
Assistant Examiner—John F. Niebling
Attorney, Agent, or Firm—Hill, Gross, Simpson, Van Santen, Steadman, Chiara & Simpson

[57] ABSTRACT

An optical flint glass having relatively low refractive indices from nd 1.65 to nd 1.87, high dispersions from $\nu$d 32 to $\nu$d 21 and varying relative partial dispersions.

5 Claims, No Drawings

OPTICAL FLINT GLASS WITH RELATIVELY LOW REFRACTIVE INDICES AND HIGH DISPERSION

The invention relates to an optical flint glass, which has relatively low refractive indices from nd 1.65 to nd 1.87, high dispersions from $\nu$d 32 to $\nu$d 21 and varying relative partial dispersions.

Such glasses are frequently referred to as "low flints." They usually contain large quantities of titanium dioxide, which in known manner contributes to a particularly high degree to increasing the dispersion with relatively low refractive indices. In general, silicate glasses with a low flint character are based on the ternary systems $SiO_2$ - $Na_2O$ - $TiO_2$ and $SiO_2$ - $K_2O$ - $TiO_2$. The higher their content of $TiO_2$, the more their optical values differ from those of the conventional flint glasses based on lead silicate.

However, these glasses with high titanium content are less suitable for the production of optical glasses on a technical scale, since they show a strong tendency to crystallization. Addition of lead oxide can provide an improvement, as can be seen from German Auslegeschrift No. 1,225,350.

It is known from German Auslegeschrift No. 1,292,807 to add $B_2O_3$ to the glasses of the basic system in order to improve the capacity for production. However, the required high dispersion is again reduced by this addition and moreover the chemical resistance is decreased.

Furthermore, it is known from Offenlegungsschrift No. 1,496,559 to add $Al_2O_3$ to the batch in order to improve the behaviour in melting, but this results more especially in a reduced heat expansion. In this case also, the dispersion is reduced. In addition, because of the $Al_2O_3$ content, the tendency of the titanium to change into the trivalent state, which results in a brown to violet colouring, is assisted.

It has become known to vary the optical values by adding CaO and BaO in accordance with German Pat. Specification No. 556,895. The addition of these alkaline earth oxides also results in a considerable reduction of the colour dispersion.

The addition of $Sb_2O_3$ to silicate glasses containing titanium oxide, because of its stabilizing and dispersion-promoting action, has been proposed in French Pat. Specification No. 1,591,505. The titanium glasses which are per se already yellowish in colour hereby experience a deepening in colour, more especially with glasses with relatively high contents of $TiO_2 + Sb_2O_3$. This deepening of colour is disturbing for many uses.

The object of the present invention is an optical flint glass with refractive values from nd 1.65 to nd 1.87 and a high dispersion from $\nu$d 32 to $\nu$d 21, which has large quantities of titanium oxide, presents a good chemical resistance and with which the tendency to crystallization is substantially reduced.

According to the invention, this glass consists of 5 – 45% by weight of $SiO_2$, 5 – 27% by weight of $K_2O$, 8 – 40% by weight of $Nb_2O_5$, 15 – 41% by weight of $TiO_2$ and 0 – 35% by weight of PbO, the maximum content of $352$ + PbO amounting to 52% and the content of $TiO_2$ + PbO + $Nb_2O_5$ amounting to 35 – 70% by weight. $Nb_2O_5$ can be wholly or partially replaced by $Ta_2O_5$.

Furthermore, $K_2O$ can be wholly or partially replaced by $Na_2O$.

The glasses according to the invention can contain additions of up to altogether 6% by weight of $WO_3$, $As_2O_3$ and $Bi_2O_3$.

It is possible to add small amounts of $Li_2O$.

U.S. Pat. Specification No. 3,060,041 describes alkaline earth silicate glasses which can contain $Nb_2O_5$ or $Ta_2O_5$ as well as $TiO_2$. According to their basic composition, the optical position of these glasses does not correspond to the low flint which is the aim in the present case, and this is also further expressed by the fact that these glasses are melted substantially alkali-free.

As is known, the oxides of niobium and tantalum are used in small percentages for varying the optical values and for improving the chemical stability. Hence, the examples of glass compositions in French Pat. Specification No. 1,591,505 contain 5% by weight of $Nb_2O_5$ or $Ta_2O_5$ in addition to the basic composition ($SiO_2$, $TiO_2$, $Sb_2O_3$, $K_2O$).

Likewise, the examples in Offenlegungsschrift No. 1,496,559 (basic composition $SiO_2$, $TiO_2$, $Al_2O_3$, $Na_2O$) contain 2% by weight of $Nb_2O_5$ or $Ta_2O_5$.

The positive properties as hereinafter described of the oxides of niobium and tantalum in the glasses according to the invention are improved with increasing percentages. Both niobium oxide and tantalum oxide stabilize the glasses of the compositions which are indicated here, but more especially those with higher $TiO_2$ contents, which show a considerable tendency to crystallization. Other stabilizing additives of higher valency, for example, oxides of As, Sb, Bi and W, generally have a tendency to intensify the yellowish colouring of the titanium glasses. Surprisingly, this is not the case with the additions of $Nb_2O_5$ and $Ta_2O_5$, so that also the glasses having relatively high and high light refraction, that is to say, those with high $TiO_2$ content, show a less intensive colour.

The oxides of niobium and tantalum do not impair to any appreciable degree the extremely colour-dispersing action of the titanium oxide, so that also glasses with a moderate $TiO_2$ content can have added thereto high contents of niobium oxide or tantalum oxide, without the deep flint character of the glasses being lost.

The possibilities of introducing such considerable amounts of $Nb_2O_5$ and $Ta_2O_5$ into glasses having a high titanium content and substantially free from boron oxide and aluminum oxide, and their positive action on the group of deep flint glasses, was not to be immediately expected, since the essential titanium dioxide generally reacts on the addition of highly charged cations with an increase in its tendency to crystallization. It is furthermore surprising that the addition of also larger percentages of niobium oxide and tantalum oxide does not have any appreciable deleterious effect on the colour-dispersing action of the $TiO_2$, especially when it is borne in mind that both oxides can be used in borate and borosilicate glasses for increasing the refractive power of special crown and flint glasses, whereas with the glasses according to the invention, there is in fact produced a relatively low refractive power, compared with flint glasses having the same colour dispersion.

The glasses show differing relative partial dispersions, for example, the glass No. 10 which is indicated in the following table:

$$\frac{n_g - n_{e'}}{n_F - n_c} = 1.0956 \qquad \frac{n_g - n_F}{n_F - n_c} = 0.6173$$

An optical flint glass according to the invention can be produced as follows:

380 g of $SiO_2$, 250 g of $TiO_2$, 170 g of $Ta_2O_5$, 200 g of $K_2O$ (in the form of $K_2CO_3$ or $KNO_3$) and 5 g of $Na_2HAsO_4$ are fused or melted in a platinum crucible at a temperature of 1,400°C in an electric oven and refined for 45 minutes at 1,420° C. The glass is thereafter stirred for 40 minutes, the melt being slowly cooled to 1,300°C. The glass is thereafter poured into a preheated steel mold and subjected to the conventional cooling process. The glass presents the following optical values: nd 1.6843; νd 29.7.

The table shows compositions of glasses according to the invention in percentages by weight.

|  | 1 | 2 | 3 | 4 | 5 |
|---|---|---|---|---|---|
| $SiO_2$ | 15 | 35 | 35 | 38 | 45 |
| $TiO_2$ | 25 | 25 | 27 | 25 | 27 |
| PbO | | | | | |
| $K_2O$ | 20 | 20 | 25 | 20 | 20 |
| $Na_2O$ | | | | | |
| $Nb_2O_5$ | 40 | 20 | 13 | | 8 |
| $Ta_2O_5$ | | | | 17 | |
| $WO_3$ | | | | | |
| $As_2O_5$ | | | | | |
| $Bi_2O_3$ | | | | | |
| nd | 1.8604 | 1.7387 | 1.6988 | 1.6843 | 1.6802 |
| νd | 21.68 | 25.97 | 28.82 | 29.78 | 29.28 |

|  | 6 | 7 | 8 |
|---|---|---|---|
| $SiO_2$ | 5 | 16 | 35 |
| $TiO_2$ | 30 | 31 | 35 |
| PbO | | | |
| $K_2O$ | 25 | 20 | 20 |
| $Na_2O$ | | | |
| $Nb_2O_5$ | | 33 | |
| $Ta_2O_5$ | 40 | | 10 |
| $WO_3$ | | | |
| $As_2O_5$ | | | |
| $Bi_2O_3$ | | | |
| nd | 1.8207 | 1.8604 | 1.7329 |
| νd | 23.58 | 21.68 | 26.23 |

|  | 9 | 10 | 11 | 12 | 13 |
|---|---|---|---|---|---|
| $SiO_2$ | 30 | 17 | 40 | 40 | 40 |
| $TiO_2$ | 38 | 41 | 15 | 15 | 15 |
| PbO | | | | | |
| $K_2O$ | 22 | 25 | 20 | 20 | 20 |
| $Na_2O$ | | | | | |
| $Nb_2O_5$ | 10 | | 25 | 25 | 25 |
| $Ta_2O_5$ | | 17 | | | |
| $WO_3$ | | | | | 5 |
| $As_2O_5$ | | | 6 | | |
| $Bi_2O_3$ | | | | 5 | |
| nd | 1.7703 | 1.8041 | 1.6973 | 1.7000 | 1.6947 |
| νd | 23.09 | 23.38 | 29.48 | 29.25 | 29.61 |

|  | 14 | 15 | 16 | 17 | 18 |
|---|---|---|---|---|---|
| $SiO_2$ | 17 | 15 | 25 | 25 | 40 |
| $TiO_2$ | 15 | 15 | 15 | 17 | 17 |
| PbO | 21 | 30 | 35 | 35 | 20 |
| $K_2O$ | 27 | 20 | 5 | 5 | 5 |
| $Na_2O$ | | | | | |
| $Nb_2O_5$ | 20 | 20 | 20 | | |
| $Ta_2O_5$ | | | | 18 | 18 |
| $WO_3$ | | | | | |
| $As_2O_5$ | | | | | |
| $Bi_2O_3$ | | | | | |
| nd | 1.7231 | 1.8171 | 1.8422 | 1.8539 | 1.7271 |
| νd | 23.67 | 23.12 | 22.09 | 22.22 | 26.60 |

|  | 19 | 20 | 21 | 22 |
|---|---|---|---|---|
| $SiO_2$ | 33 | 30 | 33 | 30 |
| $TiO_2$ | 31 | 38 | 24 | 19 |
| PbO | 5 | | 10 | 12 |
| $K_2O$ | 22 | | 12 | |
| $Na_2O$ | | 22 | 10 | 27 |
| $Nb_2O_5$ | | 10 | 6 | 12 |
| $Ta_2O_5$ | 9 | | 5 | |
| $WO_3$ | | | | |
| $As_2O_5$ | | | | |
| $Bi_2O_3$ | | | | |
| nd | 1.7289 | 1.7855 | 1.7329 | 1.7115 |
| νd | 26.64 | 24.13 | 27.54 | 28.57 |

What I claim is:

1. Optical flint glass with relatively low refractive indices from nd 1.68 to nd 1.87, a high dispersion from d 30 to d 21, and differing relative partial dispersions consisting essentially on a 100 percent total weight basis of
   1. 5-45% by weight of $SiO_2$
   2. 5-27% by weight of $K_2O$ and/or $Na_2O$
   3. 8-40% by weight of $Nb_2O_5$ and/or $Ta_2O_5$, said amount being sufficient to stabilize the glass against crystalization without intensifying the yellowish coloring of the glass
   4. 15-41% by weight of $TiO_2$
   5. 0-35% by weight of PbO and
   6. 0-6% by weight of at least one oxide of the group consisting of $WO_3$, $AS_2O_3$ and $Bi_2O_3$ the maximum content of $TiO_2$+PbO amounting to not more than 52% by weight and the content of $TiO_2$+PbO+$Nb_2O_5$+$Ta_2O_5$ amounting to 35-70% by weight.

2. Optical flint glass in accordance with claim 1 in which (2) is $K_2O$.
3. Optical flint glass in accordance with claim 2 in which (3) is $Nb_2O_5$.
4. Optical flint glass in accordance with claim 1 in which (2) is $Na_2O$.
5. Optical flint glass in accordance with claim 4 in which (3) is $Nb_2O_5$.

* * * * *